United States Patent [19]

Madsen et al.

[11] 4,331,499
[45] May 25, 1982

[54] METHOD AND AN ARRANGEMENT FOR THE MANUFACTURE OF CYLINDRICAL TUBES

[75] Inventors: Finn T. Madsen, Birkeröd; Steffen Kjaerbye-Petersen, Farum, both of Denmark

[73] Assignee: Tetra Pak Developpement SA

[21] Appl. No.: 172,705

[22] Filed: Jul. 25, 1980

[30] Foreign Application Priority Data

Jul. 26, 1979 [CH] Switzerland ............... 6936/79

[51] Int. Cl.³ ............................................. B29D 23/10
[52] U.S. Cl. ............................. 156/304.5; 156/203; 156/258; 156/466; 156/510
[58] Field of Search .............. 156/85, 159, 200, 203, 156/211, 215, 218, 254, 258, 304.5, 461, 463, 466, 510

[56] References Cited

U.S. PATENT DOCUMENTS

| | | | |
|---|---|---|---|
| 3,332,138 | 7/1967 | Garner | 156/203 |
| 3,449,186 | 6/1969 | Rano | 156/159 |
| 3,486,964 | 12/1969 | Brunlid | 156/203 |
| 3,650,868 | 3/1972 | Murota | 156/218 |
| 4,080,235 | 3/1978 | Mandersson | 156/218 |
| 4,100,003 | 7/1978 | Trusch | 156/54 |
| 4,100,005 | 7/1978 | McNeal | 156/73.1 |

Primary Examiner—John E. Kittle
Attorney, Agent, or Firm—Burns, Doane, Swecker & Mathis

[57] ABSTRACT

For the purpose of producing a packing container a web of laminated material is used, which material includes a base layer of foamed polystyrene, and two outer layers of homogeneous polystyrene.

In order to seal the edge zones of the material web into a tube a part of the base layer of one of the edge zones is removed and the other edge zone is inserted into this cut off part between the remaining end parts of the outer layers and is heat-sealed to the outer layers. The so achieved sealing is tight and durable and superior to the known overlap sealing. The seal is also more pleasing from the aesthetic point of view.

10 Claims, 14 Drawing Figures

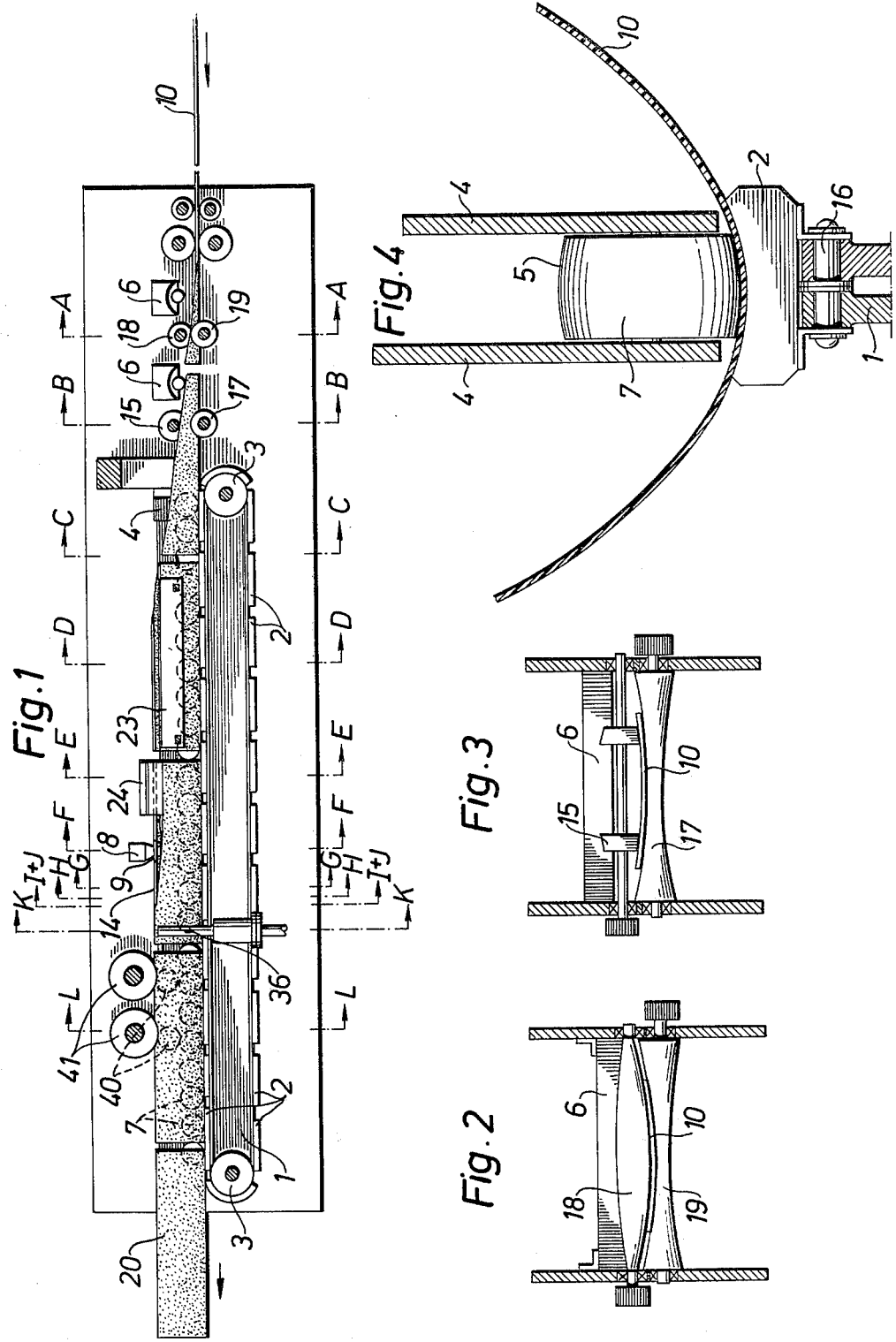

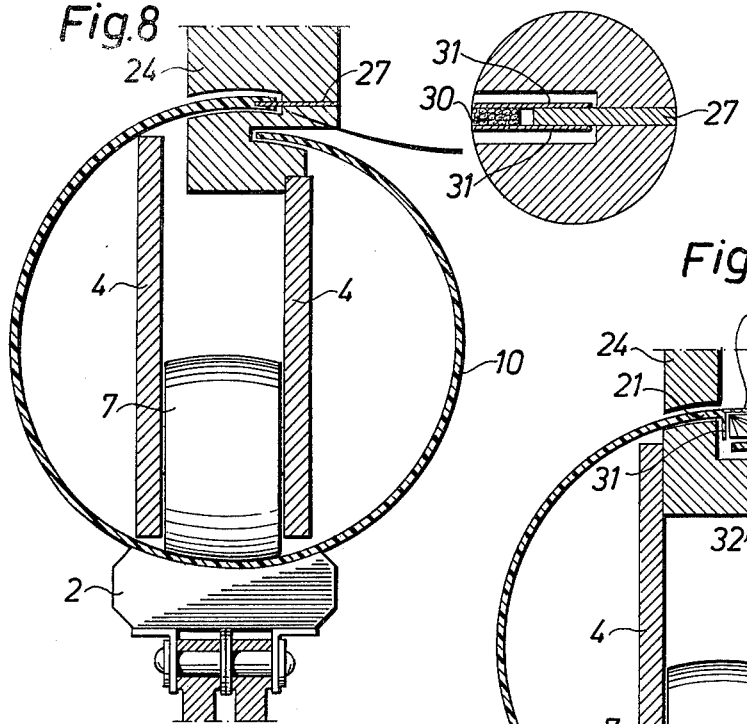
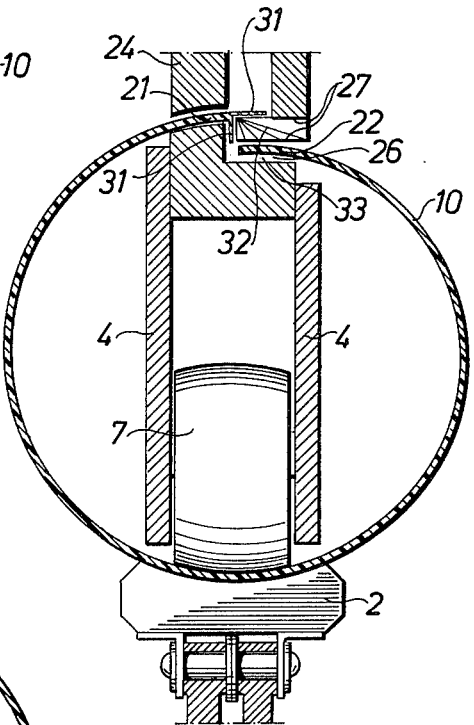
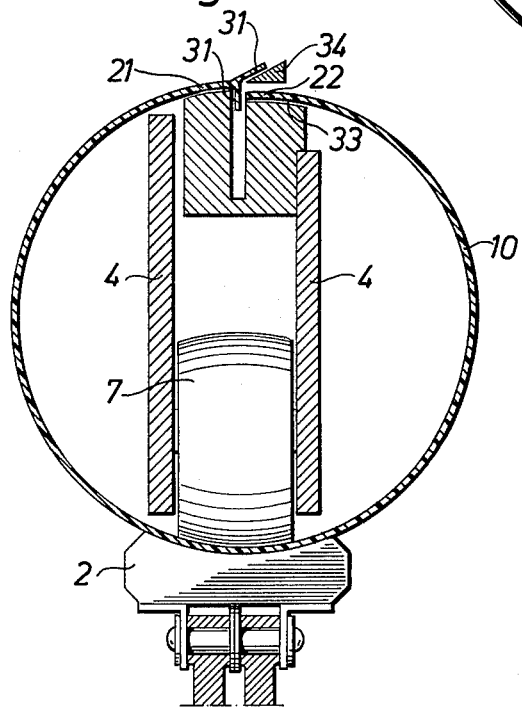

METHOD AND AN ARRANGEMENT FOR THE MANUFACTURE OF CYLINDRICAL TUBES

BACKGROUND AND SUMMARY OF THE PRESENT INVENTION

The present invention relates to a method and apparatus for the joining of the edges of webs or sheets comprising heat-sealable material.

In packaging technique, for example, containers are frequently manufactured in such a manner that a sheet or a web of packing material is folded to a tube by joining together the longitudinal edges of the sheet or web, whereupon the tube formed is used in various manners as a container body or as a strengthening casing.

It is known that tubes of the type referred to here can be formed by using sheet material which is heat-shrinkable. Such a shrinkable material can be obtained if e.g. an extruded foamed plastic film is stretched in connection with the manufacture, as a result of which the film obtains a cellular structure with oblong, extended cells. Such a "stretched" foamed plastic material, e.g. polyestyrene foamed plastics, will shrink on being heated to the softening temperature of the plastics since the cells then return to their normal sperical shape. A foamed plastic material of the type referred to here has found application for the shrink forming of cups and the like by placing a cylinder or casing of the material around a profiled mandrel and heating the material to shrinking temperature. In this way the cylinder or casing shrinks and assumes the shape of the mandrel. After cooling, the shrunk casing, which then has obtained cup-shape, can be removed from the mandrel. As mentioned previously, a cylindrical casing is used as a starting object in the shrink forming of cups or other container bodies, and this casing in turn has been produced from a plane sheet or web of shrinkable material.

If the material consists exclusively of foamed plastics, the mechanical properties will be poor, since the foamed plastic material has relatively poor intrinsic rigidity and a very low tensile strength. A much better material from a point of view of tensile strength can be obtained if the foamed plastic material is laminated with homogeneous plastic layers. It is known that such laminates can be used in connection with shrink forming, since the outer homogeneous plastic layers will be shaped together with the foamed plastic layer during this shrinkage.

Such a laminated material may consist of a central layer of polystyrene foam plastics and outer homogeneous layers of polystyrene. Since the outer layers, which are relatively rigid, are placed at a relatively great distance in relation to one another (approx. 1 mm or more) through being separated by the central layer of foamed plastics, the laminate will have very great rigidity in relation to its weight. The tensile strength properties too will be considerably improved since the homogeneous plastic layers have a substantially higher tensile strength than the foamed plastic layer.

If a sheet of foamed plastics or of the abovementioned laminate is formed to a tube by making the edge zones of the sheet overlap one another, the joint zone will have a considerable thickness, since the laminate comprising foamed plastic layers is in most cases substantially thicker than corresponding materials e.g. paper or homogeneous plastic material. This thick joint zone is for one thing unsightly and for another the joint zone may pose problems of tightness in connection with the attachment of the top and bottom parts, since the joint constitutes a considerable discontinuity around the periphery of the casing or tube. Furthermore, in an overlap joint of the type mentioned, only the laminate layers facing one another are joined together. The inner and outer layers in the overlap joint as well as the central foamed plastic layer are not included in the joint.

These disadvantages are overcome by the present invention, which is characterized in that one or more webs or sheets are combined along their edge zones with simultaneous movement in longitudinal direction of the edge zones. The edge zone of the one web or sheet is guided, prior to the combination, past a cutter device, by means of which the central portion of the edge zone is cut away. Then one of the edge lugs formed during the cutting is folded away and the edge zone of the unmachined web or sheet is fitted into the space of the machined edge of the web which has been cut out. The edge lug that has been folded away is returned to its original position, and heat is supplied to the joint zone comprising the two combined edge zones which are compressed with the surfaces melting together, so that a tight and mechanically durable joint is obtained.

BRIEF DESCRIPTION OF THE DRAWINGS

A preferred embodiment of a method and apparatus for joining edge zones of webs or sheets according to the present invention will be described with reference to the accompanying drawings wherein like members bear like reference numerals and wherein:

FIG. 1 is a schematic view of an apparatus for the manufacture of a tube or casing in accordance with the invention, FIG. 2 is a schematic view of the apparatus taken along the line A—A of FIG. 1;

FIG. 3 is a schematic view of the apparatus taken along the line B—B in FIG. 1;

FIG. 4 is a schematic view of the apparatus taken along a line C—C in FIG. 1;

FIG. 8 is a schematic view of the apparatus taken along the line G—G in FIG. 1;

FIG. 9 is a schematic view of the apparatus taken along the line H—H in FIG. 1;

FIG. 10 is a schematic view of the apparatus taken along the line I—I in FIG. 1;

DETAILED DESCRIPTION OF THE PREFERRED EMBODIMENT

Figure 5:
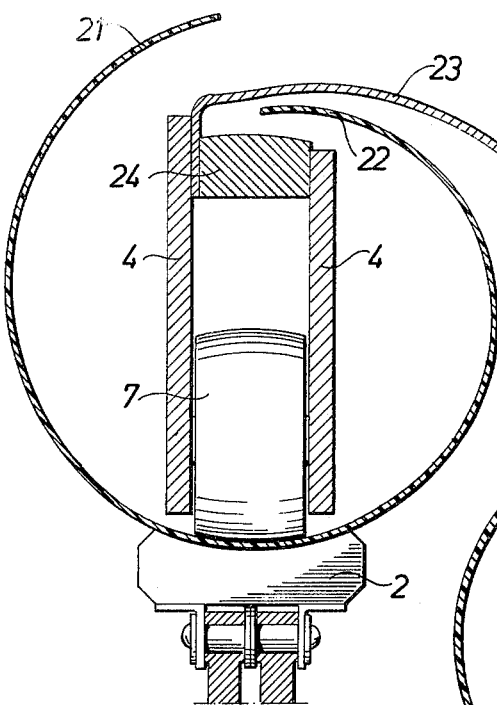
FIG. 5 is a schematic view of the apparatus taken along the line D—D in FIG. 1.

In the following description it is assumed that the material formed consists of a laminate comprising a central layer of stretched polystyrene foam plastics, which layer is covered on both sides with thin layers of homogeneous polystyrene material. The distribution of layer thickness is such that the central layer alone takes up at least 80% of the thickness of the laminate, and that the total thickness of the laminate is between 1 and 5 mm.

With regard to surface area weights of the layers contained in the laminate, the central foam layer as well as the outer homogeneous layers have a surface area weight of between 30 and 80 g/m².

The advantage of such a laminate is that it has great rigidity in relation to the weight of the plastic, and it is moreover heat-insulating. It will be readily understood that an ordinary overlap joint in a laminate of the type described here, beside giving a considerable joint thickness and an unsightly discontinuity on a tube or a casing which has been formed of the laminate from a sheet whose edges are combined in an overlap joint, will also have relatively little strength, since the actual joint which has to support all the stresses is constituted of a sealing joint between the homogeneous inside layer of the laminate and its outside layer in the sealing region. It is also assumed that the laminated material has been treated (stretched) so that it is heat shrinkable, the shrinkage characteristics being such that the tube or casing formed has its main shrinking capacity in its transverse direction.

For the sake of clarity the arrangement will first be described in detail, whereupon a description of the method will follow.

With reference to FIG. 1, an endless conveyor belt 1 is arranged to move between two driven wheels 3. On the conveyor belt 1 carriers 2 consisting of blocks of elastic material, e.g. rubber, are arranged, which blocks have a concave working surface. Parallel with the conveyor belt 1 two stationary bars 4, parallel with one another, are arranged which bars 4 support a number of rollers 7 with convex rolling surface. One or more of the rollers 7 may be driven by means or driving arrangements, not shown here. However, the driving of the rollers 7 is preferably arranged so that it is synchronous with the movement of the conveyor belt 1, so that there is no "slipping" between the blocks 2 and the working surfaces of the rollers 7.

With further reference of FIG. 1, a heating arrangement 6 comprises a number of radiant elements which direct the heat radiation down towards the sheet 10 intended for casing formation. Moreover the arrangement in accordance with FIG. 1 comprises a number of guide rails and steering devices which will be described in more detail with reference to the following figures. The arrangement further comprises a rotary cutter 9 which is driven by a motor 8. In the same plane as the cutter disc 9 a guiding plate 14 and elements for the folding down of the edge zone of the cut material formed in the cutting operation are arranged adjoining the cutter disc 9. Furthermore, a heating device is arranged to blow hot air towards the portions of the casing material intended for sealing, and a pressure roller 41 and a counter roller 40 are also provided. The sheet material 10 required for the manufacture of the casing is is formed into the finished casing 20. The arrangement according to FIG. 1 presents on the feed side of the sheet 10 two pairs of cambered rollers 18, 19 and 15, 16, between which the sheet 10 is conducted with simultaneous heating by the heating elements 6, the sheet 10 being initially formed to a tube in that a curved shape is imparted to the sheet.

With reference to FIG. 2, which corresponds to the section A—A in FIG. 1, the sheet 10 is introduced between a pair of feed rollers, not described in detail, to be conducted subsequently under the heating element 6 where one side of the sheet is heated and caused to shrink which gives the sheet a tendency to "roll up". The deformation of the initially plane sheet 10 is controlled with the help of the cambered rollers shown in FIG. 2, and after a further heating of the sheet 10 it is introduced under the forming rollers 15, 17 shown in FIG. 3 (section B—B of FIG. 1) and, as is evident from FIG. 3, it is not necessary for the rollers 15 to be constituted of a single piece but they may be composed of a number of separate rollers arranged on the same axle.

With reference to FIG. 4, which shows a section C—C of FIG. 1, the rollers 7, which have a convex working surface 5, are fixed and supported in the parallel and stationary bars 4. The sheet 10 of a laminated material is introduced between the rollers 7 and the carriers 2 of the conveyor belt 1, which in points of support 16 are fixed at the links of the conveyor belt 1. The sheet 10 thus introduced between rollers 7 and carriers 2 is heated by the radiation source 6 in such a manner that the side of the sheet 10 facing the radiation source 6 is heated more than the opposite side. This has the result that the plastic material on the side facing the heating source is heated to softening with the cellular structure of the central foamed plastic material being altered in such a manner that the cells tend to resume their normal spherical shape. This means that the sheet 10 will shrink along the side which is facing towards the heat source, and as the sheet 10 is shrinkable substantially only in transverse direction, the effect of the heat action will be that the sheet 10 will tend to assume first a curved shape and will then "roll up" to a cylinder. With reference to FIG. 5 the sheet 10 acquires a curved shape and tends to assume tubular shape. In order to control the shaping, one edge 22 of the sheet 10 is introduced underneath a guiding plate 23, which is fixed to the longitudinal stationary bars 4. The shaping with the help of the guiding plate 23 shown takes place at section D—D in FIG. 1, and at section E—E the sheet edges 21 and 22 are guided in the manner as shown in FIG. 6 into spaces 25 and 26 of a guiding bar 24 which constitutes a continuation of the guiding plate 23.

Figure 6:
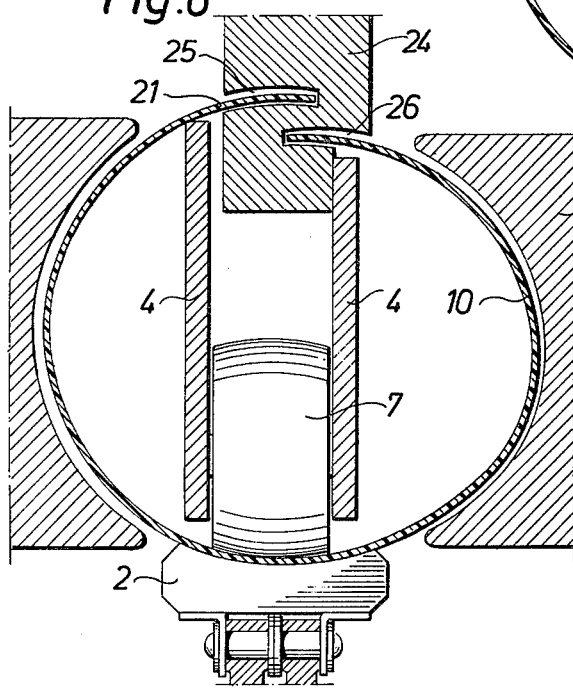
FIG. 6 is a schematic view of the apparatus taken along the line E—E in FIG. 1.

On the outside the casing 10 formed is surrounded, as can be seen in FIG. 6, at the places where this is required, by outer stationary supporting blocks 27 which are preferably made of a low-friction plastic material, such as e.g. TEFLON. With the help of the supporting blocks 27 the web edge 21 of the sheet 10 can be fitted into the space 25, which at the "entrance side" of the guiding bar 24, directly following the guiding plate 23, is wide so as to facilitate the entry of the web edge. Subsequently the guiding space 25 narrows so as to define accurately the position of the web edge. In a similar manner the guiding space 26 is formed in that the guiding plate 23 successively draws closer to the guiding bar 24 and eventually changes into a groove or space 26, into which the web edge 22 is guided. The section shown in FIG. 6 corresponds to the section E—E in FIG. 1.

Figure 7:
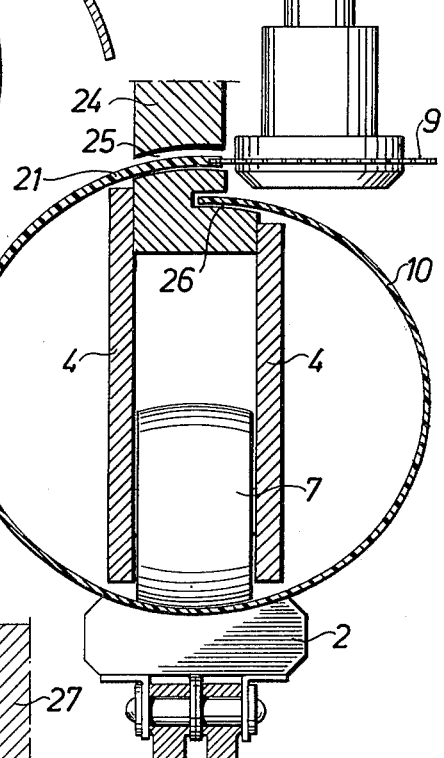
FIG. 7 is a schematic view of the apparatus taken along the line F—F in FIG. 1.

With reference to section F—F in FIG. 1, which is shown in FIG. 7, the guiding bar 24 is shifted so that the web edge 21 is exposed during continuous accurate positioning in vertical sense while the sheet 10 with its edge 21 is guided past a rotary cutter disc 9 which is driven by a motor. The cutter disc 9, which is of a width which corresponds to or which is slightly less than the thickness of the central foamed plastic layer 30 of the laminate, cuts away the foamed plastic layer up to a certain, predetermined depth, while the outer homogeneous plastic coverings are not affected by the cutting operation.

With reference to FIG. 8 which corresponds to section G—G in FIG. 1, a fixed guiding plate 27 of a thickness which corresponds to the thickness of the cutter 9 is arranged in the same plane as the cutter 9 and is guided into the cut-out section of the web edge 21 so as to guide and hold apart the homogeneous edge lugs 31.

Figure 11:
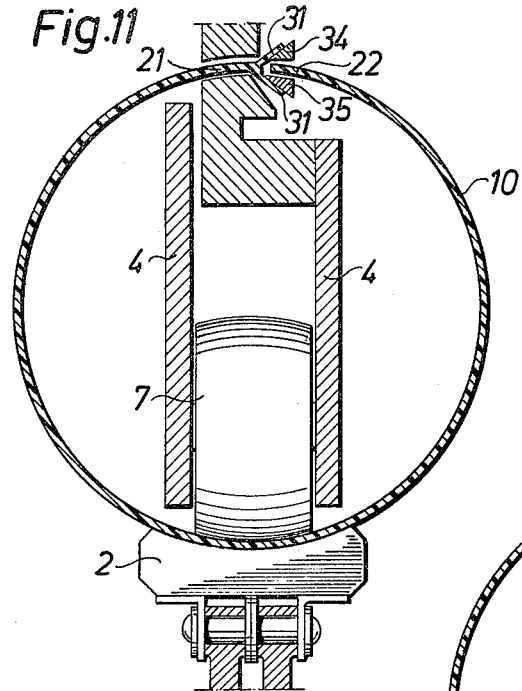
FIG. 11 is a schematic view of the apparatus taken along the line J—J in FIG. 1.

As can be seen from FIG. 9, which corresponds to section H—H in FIG. 1, the guiding plate 27 is provided with a guiding edge 32 which successively folds down the bottom edge lug 31 at the same time as the upper supporting edge for the sheet edge 22 in the space 26 disappears. The bottom edge lug 31 is folded down and away over 90° or more with the help of the guiding edge 32 and is retained in the folded-away position. The bottom sheet edge 22 is guided subsequently by the progressively rising guiding edge 33 to the same vertical position as the sheet edge 21, as best seen in FIG. 10, which corresponds to the section J—J in FIG. 1. With further reference to FIG. 10, the upper edge lug 31 is bent upwards a little with the help of a special guiding bar 34. The sheet edge 22 is guided by the guiding edge 33 up to the position aligned with the sheet edge 21 (as seen in in FIG. 11) representing section J—J in FIG. 1. In this position the bottom edge lug 31 is partially returned and is retained in the desired position by a guiding bar 35, the sheet edge 22 being fixed in its position between the said guiding bars 34 and 35.

Figure 13:
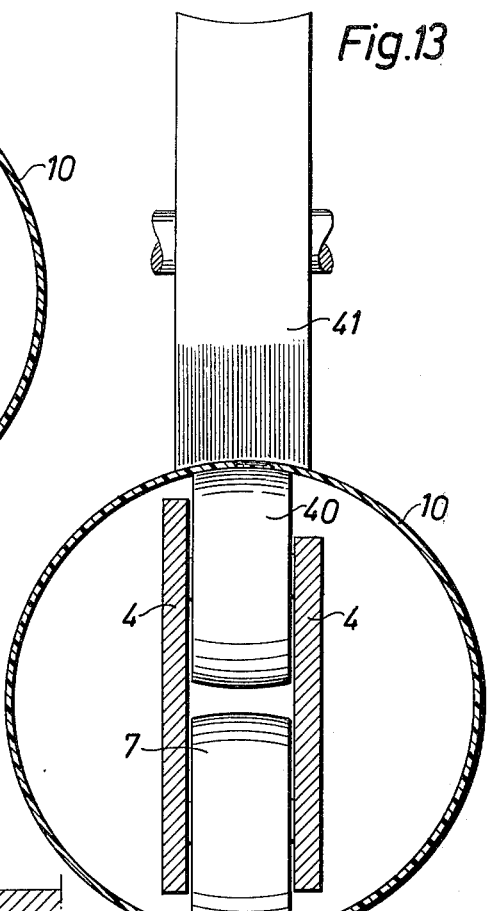
FIG. 13 is a schematic view of the apparatus taken along the line L—L in FIG. 1.
Figure 12:
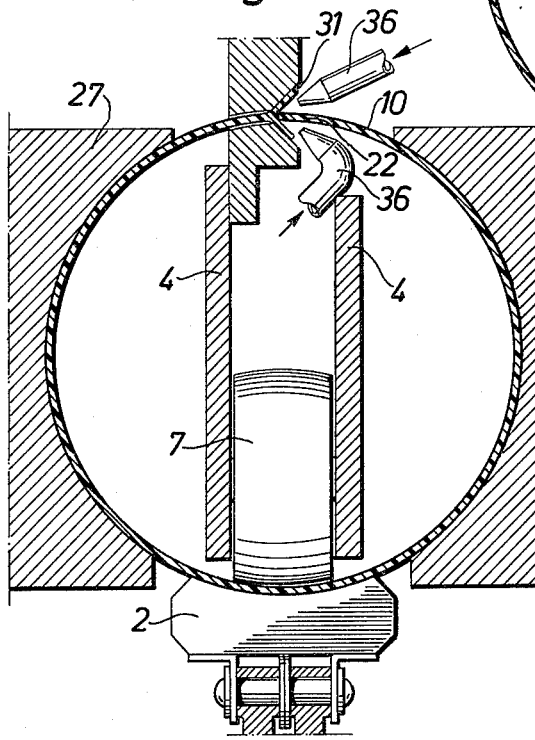
FIG. 12 is a schematic view of the apparatus taken along the line K—K in FIG. 1.

With reference to FIG. 12, which corresponds to section K—K in FIG. 1, hot air is blown with the help of the hot air nozzle 36 towards the slightly separated edge lugs 31 and also towards the edge zone of the sheet edge 22. By means of the hot air the edge lugs 31 of homogeneous plastic material (e.g. polystyrene) as well as the edge zone 22 are heated to sealing temperature. With reference in FIG. 13 the edge zones 21 and 22 of the sheet 10, heated and joined together, are sealed to one another in a tight and mechanically durable joint by being pressed together between the pressure rollers 40 and 41.

Figure 14:
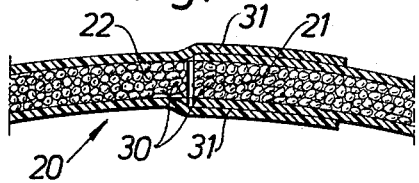
FIG. 14 is a cross-sectional view through a casing joint formed by the apparatus of FIG. 1.

With reference to FIG. 14 which illustrates a greatly enlarged joint in a casing 20 manufactured in accordance with the invention, the sheet edges 21 and 22 are joined together in such a manner that the central foamed plastic layers 30 are situated on the same level, edge to edge, whilst the free edge lugs 31 of the sheet edge 22 overlap the outer homogeneous plastic layers of the sheet edge 21. As mentioned earlier the edge lugs 31 are heat-sealed to the homogeneous plastic layer of the sheet edge 21, giving a strong joint with a minimum of disturbing discontinuities.

It has been found that by using the present invention plastic casings of shrinkable foamed plastics with high capacity can be made, and thanks to the joints being uniform and strong any further processing of the casings, e.g. continued shaping through shrinkage to produce drum- or flasklike containers, is greatly facilitated.

It is conceivable within the scope of the invention to use material other than the foamed plastic laminate suggested here, and instead of the foamed plastics as the central laminate layer, fibrous material, such as paper or cardboard, may be used. Furthermore it is not absolutely essential that the central layer of the laminate should be removed by cutting with the help of a rotary cutting disc. It is also conceivable for the central layer to be cut out or to be removed by a chemical process, or to subject it to such a strong thermal action, that the cellular structure is destroyed and that the foamed plastic layer recedes in between the homogeneous layers.

In the description of the preferred embodiment of the invention it is mentioned that one of the end lugs 31 is folded down and the edge 22 of the sheet 10 is raised vertically by means of the guiding surface 13 (see FIG. 9 and 10 and accompanying parts of the description), but it is also possible just to separate the lugs 31 and the insert the end 22 of the sheet 10 by a horizontal movement or a combined horizontal and vertical movement.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in the appended claims be embraced thereby.

What is claimed is:

1. A method for joining edge zones of webs or sheets of heat-sealable plastic material, comprising the steps of moving edge zones of at least one web or sheet toward one another while simultaneously moving the at least one web or sheet in a longitudinal direction of said edge zones, guiding one edge zone of the at least one web or sheet past a cutter device, removing a central portion of the one edge zone to form two edge lugs, folding back one of the edge lugs formed in the cutting, fitting the other, uncut edge zone into the central portion of the cut edge zone of the web or sheet, returning the edge lug folded away to is original position to form a joining zone, supplying heat to the joining zone comprising the two combined edge zones, compressing the joining zone to melt the surfaces together, whereby a tight and mechanically durable joint is obtained.

2. A method in accordance with claim 1, further comprising the steps of forming a tube from a sheet of a laminate comprising a central layer of paper or foamed plastics and outer layers of homogeneous plastic material by bending the sheet such that edge zones are progressively brought together, cutting away substantially all of said central layer of one edge zone, maintaining the outer laminate layers of thermoplastic material intact to form free lugs of thermoplastic material, guiding the other edge zone into the cut away central layer of the one edge zone, heating to sealing temperature said lugs of thermoplastic material and the outsides of the outer thermoplastic layer of the uncut edge zone, which outsides rest against said lugs, compressing and simultaneously cooling the joint zone thus formed, whereby the outer edge lugs of the thermoplastic material of the cut edge zone are sealed to the outer thermoplastic layers of the uncut edge zone.

3. A method in accordance with claim 2, further comprising the steps of guiding the edge zones of the sheet on formation of the tube so that the edge zones overlap one another without being brought in contact with each other, folding down a bottom one of the lugs of the homogeneous thermoplastic material formed in said cutting operation by a guiding device, guiding the bottom edge zone of the sheet in the tube up to the same level as the cut edge zone, returning the bottom lug of the thermoplastic material to the original position, directing a stream of hot air in between the said lugs of thermoplastic material and the outside of the outer homogeneous thermoplastic layer of the uncut edge zone so as to heat said thermoplastic layers to sealing temperature and seal the layers to one another.

4. A method in accordance with claim 2, wherein said sheet of laminate comprises a central layer of polystyrene foam plastic and outer layers of homogeneous polystyrene, the total thickness of the laminate being 1–5 mm, the thickness of each homogeneous plastic layers being less than 10% of the thickness of the sheet, the sheet of laminated material being able to be shrunk in a transverse direction when the sheet is subjected to heat.

5. A method in accordance with claim 4, wherein the forming of the sheet to a tube is achieved by heating one side of the sheet at the same time as the sheet is guided in the longitudinal direction past a heat source thereby shrinking the sheet in the transverse direction, and wherein the sheet is guided during and after shrinkage to tubular shape by outer supports and by an inner guiding plate which guide the one sheet edge zone under the other, and wherein the sheet edge zones are fixed in position in relation to one another in an overlapping position by conducting the sheet past guiding bars having recesses for the sheet edge zones.

6. A method in accordance with claim 3, further comprising conducting an upper one of the overlapping edge zones past a rotary cutter disc having a cutting width which corresponds to or is slightly less than the thickness of the central foamed plastic layer of the laminate, cutting away said central foamed plastic layer with the cutter disc to a depth which is considerably greater than the total thickness of the laminate but which is less than the width of the two overlapping edge zones being guided, folding down the bottom edge lug of homogeneous plastic material of the upper overlapping sheet edge zone by a guiding bar while the tube being formed is led past the guiding bar, guiding the bottom overlapped sheet edge zone up level with the overlapping sheet edge zone, fitting the bottom sheet edge zone into the space cut into the upper sheet edge zone, and returning the edge lug folded down to its original position.

7. An apparatus for joining edge zones of webs or sheets of heat-sealable plastic material, comprising an endless conveyor belt with carrier devices for moving and supporting a web, rollers co-operating with said conveyor belt which rollers are fixed in stationary, longitudinal supporting plates substantially parallel with the conveyor belt such that the web is arranged between the rollers and the carrier devices, stationary outer supporting devices, guiding bars supported by said supporting plates, said outer supporting devices and said guiding bars together guiding edge zones of a web or sheet toward one another, a cutter device comprising a rotary cutter disc for removing a central portion of one edge zone to form two edge lugs, said cutter disc being arranged generally parallel to the conveyor belt, means for folding back one of the edge lugs formed by the cutter device, means for fitting the other, uncut edge zone into the central portion of the cut edge zone, and means for heating and compressing the edge zones of the web or sheet after fitting the uncut edge zone into the cut edge zone.

8. The apparatus in accordance with claim 7, wherein a single sheet is formed into a tube, the carrier devices of said conveyor belt are elastic blocks with concave working surface, the stationary outer supporting devices are elements with a concave profile in a longitudinal direction of the sheet, the concave working surface of the outer supporting devices being arranged as a portion of the circumference of the tube formed.

9. The apparatus in accordance with claim 7, further comprising a stationary guiding plate of substantially the same thickness as the cutter disc arranged in the same plane as the cutter disc and located immediately after the cutter disc for maintaining the edge lugs of homogeneous plastic material formed in the cutting operation separated from one another.

10. The apparatus in accordance with claim 7, further comprising a guiding bar for folding the bottom edge lug in the cut edge zone through an angle of 90°, a first wedge-shaped guiding bar for directing the upper edge lug upwards, a second wedge-shaped guiding bar for guiding the uncut edge zone of the sheet upwards against the underside of said first wedge-shaped guiding bar and for returning the bottom edge lug to a partially folded-down position so as to form a wedge-shaped space between said edge lugs.

* * * * *